US009154513B2

(12) United States Patent
Nakayama

(10) Patent No.: US 9,154,513 B2
(45) Date of Patent: Oct. 6, 2015

(54) COMMUNICATION INFORMATION ANALYSIS SYSTEM

(75) Inventor: Takayoshi Nakayama, Tokyo (JP)

(73) Assignee: NETAGENT CO., LTD., Tokyo (JP)

( * ) Notice: Subject to any disclaimer, the term of this patent is extended or adjusted under 35 U.S.C. 154(b) by 667 days.

(21) Appl. No.: 13/011,078

(22) Filed: Jan. 21, 2011

(65) Prior Publication Data
US 2011/0194435 A1 Aug. 11, 2011

(30) Foreign Application Priority Data

Feb. 9, 2010 (JP) ................................. 2010-026045

(51) Int. Cl.
H04L 29/06 (2006.01)

(52) U.S. Cl.
CPC .................. H04L 63/1408 (2013.01)

(58) Field of Classification Search
CPC . G06F 21/10; G06F 2221/2107; G06F 21/55;
G06F 21/57; G06F 21/6218; G06F 2221/0706;
G06F 12/1408; G06F 17/00; G06F 19/323;
G06F 21/105; G06F 21/31; G06F 21/606;
G06F 21/6245; G06F 21/78; H04L 63/1048;
H04L 63/00
USPC .......... 370/252, 254, 401; 709/224–227, 202, 709/203
See application file for complete search history.

(56) References Cited

U.S. PATENT DOCUMENTS

| 7,069,293 | B2 * | 6/2006 | Cox et al. ...................... 709/203 |
| 7,197,507 | B2 | 3/2007 | Sugiura |
| 7,246,238 | B2 * | 7/2007 | Mullen et al. .................. 713/175 |
| 7,523,191 | B1 * | 4/2009 | Thomas et al. ................ 709/224 |
| 7,778,193 | B2 * | 8/2010 | Mizuno et al. ................. 370/252 |
| 7,958,234 | B2 * | 6/2011 | Thomas et al. ................ 709/224 |
| 8,456,664 | B2 * | 6/2013 | Tamura ......................... 358/1.14 |
| 8,966,060 | B2 * | 2/2015 | Miyazaki et al. ............. 709/224 |
| 2003/0084100 | A1 * | 5/2003 | Gahan et al. .................. 709/203 |
| 2006/0155855 | A1 * | 7/2006 | Hamai ........................... 709/227 |
| 2008/0077703 | A1 * | 3/2008 | Lee ................................ 709/232 |
| 2008/0092243 | A1 * | 4/2008 | Kawamoto et al. ............. 726/27 |
| 2009/0074182 | A1 * | 3/2009 | Kawamoto et al. ............. 380/44 |
| 2009/0271514 | A1 * | 10/2009 | Thomas et al. ................ 709/224 |
| 2010/0103820 | A1 * | 4/2010 | Fuller et al. ................... 370/236 |
| 2012/0278616 | A1 * | 11/2012 | Stevens .......................... 713/165 |

FOREIGN PATENT DOCUMENTS

| JP | 2008-182294 | 8/2008 |
| WO | WO 02/29579 | 4/2002 |

* cited by examiner

Primary Examiner — Edan Orgad
Assistant Examiner — Emmanuel Maglo
(74) Attorney, Agent, or Firm — Staas & Halsey LLP

(57) ABSTRACT

The communication information analysis system that executes the storing and the analyzing of the communication packets inexpensively without reducing the rate and reliability of the data communication network. The system of present invention comprises one or more communication terminals and a server computer. When the user terminal communicate with other communication terminals, the user terminal stores the packets to be sent and the received packets into itself as the electrical data file, at the acquisition unit, for example, time interval. The electrical data file is sent to the server computer and stored into it. The server computer analyzes the communication packets using the electrical data file stored in the server computer itself, when requested from the user.

10 Claims, 8 Drawing Sheets

FIG.6

| source address | 172.17.10.120 |
|---|---|
| source port | 4163 |
| destination address | 65.55.149.123 |
| destination port | 80 |
| source MAC address | 00:0a:e4:39:81:cf |
| destination MAC address | 00:10:db83:59:60 |
| state of connection | no |
| date of connection start | 2009/08/20(Thu)09:25:29.596264 |
| date of connection end | 2009/08/20(Thu)09:25:29.853659 |
| connection time | 0:00:00.257394 |
| number of packets | 4 |
| file name | c2d |
| valid transmission amount | 1192Bytes |
| valid reception amount | 414Bytes |
| actual transmission packet number | 1 |
| actual reception packet number | 1 |
| actual transmission amount | 1192Bytes |
| actual reception amount | 414Bytes |
| transmission throughput | 4631Bps |
| reception throughput | 1608Bps |
| packet data file | /0/g1249263364/pkt/2009-09-07_14_10.pkt |

COMMUNICATION INFORMATION ANALYSIS SYSTEM

BACKGROUND OF THE INVENTION

1. Field of the Invention

The present invention relates to a system that stores and analyzes data communicated via a data communication network.

2. Description of the Related Art

LAN (Local Area Network), Internet and so on are known as networks for the data communication. The communication terminal can access to the server computer and acquire the data etc. from the server computer via the data communication networks. Furthermore, the communication terminal can perform the data communication with other communication terminals via the data communication network.

When the data supplying is executed using the server computer, there is a possibility that the leakages of the secret information stored in the server computer may occur. For example, there is a case that the information of high secret level are stored in the server computer and only the particular employees are allowed to browse the information, in a LAN within a company. In such case, it is common way that certification processing is performed using certification information, for example, an ID (Identification) or a password, and the browsing is allowed only when certificated. When a leakage of secret etc. are detected, the illegal access user is tried to be identified by analyzing the communication logs of each communication terminal connected to the LAN. However, the analyzing of the communication logs etc. needs a vast amount of human work, therefore, it needs long time period and high manpower costs.

Incidentally, when a data communication is executed between the communication terminals, there is a case where a proof is requested as to whether the data communication is actually executed or not. For example, in many cases of the electric commerce using the Internet, the customer executes an order processing using an input-form displayed on a web browser or an electronic mail. However, it is probable that the customer insists the order has been sent whereas the service provider insists the order has not been received. In such case, whether the data communication is executed can be checked using the communication data stored in both of the communication terminals. However, it is difficult to prove to the third party whether the data communication is executed, because the communication data or other kinds of the electrical data can be broken or modified easily.

For solving such problems, the way of using the relay device, which comprises the function for saving the communication packets, is known.

It is expected to reduce the time period and the manpower costs necessary for solving the illegal access by automatically saving the communication packets into the relay device of the LAN etc., and reappearing the header information and the communication data of the saved communication packets. Because, it become unnecessary to analyze the communication logs by each communication terminals, when the leakage of information described above is detected. In addition, the reliability of checking whether the data communication is actually executed can be improved, because it is difficult to break or modify the communication packets saved in the relay device.

The art for saving communication packets to a relay device of a data communication network is disclosed by the International Published Patent Application WO2002/029579 and the Japanese patent laid open publication No. 2008-182294, for example.

However, the system for saving communication packets to the relay device of the data communication network has following demerits.

In the case of saving the communication packets into the relay device, a hard disk storage unit is necessary, because the stored data becomes vast. However, the writing speed of the hard disk storage unit is 100 megabytes/second (i.e. 800 Mbps) at most. Therefore, the communication rate of the high-speed data communication network (e.g. 2000 Mbps) falls because of the writing processing.

In contrast, the art of the International Published Patent Application WO2002/029579 writes the communication packets into a working memory temporarily, before storing into the hard disk storage unit. However, the art of the International Published Patent Application WO2002/029579 has a risk of causing communication packet losses (i.e. occurrence of the not-stored communication packets) when the traffic increases in the data communication network of high rate and large capacity. Therefore, the art of the International Published Patent Application WO2002/029579 has a demerit that the reliability of the packet storage processing is not enough.

Incidentally, the art of the Japanese Patent laid open publication No. 2008-182294 suppresses the reduction of the communication rate by discarding a part of the communication packets (that is, by undoing the saving of a part of the communication packets) in the relay device on purpose. However, the art of the Japanese Patent laid open publication No. 2008-182294 has a demerit similar to the International Published Patent Application WO2002/029579, that is, the reliability of the packet storage processing is not enough.

In addition, when the art of saving the communication packets into the relay device is employed, the cost of the relay device is expensive. Furthermore, when the relay device is located, an additional computer for reappearing the header information, the communication data etc. from the saved communication packets is needed to be provided in the LAN. Consequently, the cost for network constructing increases substantially, and so it is very difficult for individuals or small companies to construct such network.

SUMMARY OF THE INVENTION

It is an object of the present invention to provide a communication information analysis system which stores and analyzes the communication packets with low cost and without making the rate of the data communication network and the reliability of data storing processing to go down.

According to the first aspect of the present invention, there is provided a communication information analysis system comprising a communication terminal and a server computer, each of which is connected to a data communication network, wherein: the communication terminal comprises a storage unit which stores an electrical data of a communication packets to be sent and an electrical data of a received communication packet into itself as an electrical file; a communication unit which sends the electrical files stored in the storage unit to the server computer: and the server computer comprises an analysis unit which analyzes the communication packet using the electrical file received from the communication terminal.

According to the second aspect of the present invention, there is provided a communication information analysis system comprising a communication terminal and a server computer, each of which is connected to a data communication network, and which prevents a user's selectively breaking and modifying of a communication data related to a user's desired communication, wherein: the communication terminal comprises a storage unit which makes an electrical file of electrical data of communication packets to be sent and electrical data of received communication packets by each predetermined acquisition unit, and stores the electrical file into itself; a communication unit which sends the electrical file stored in the storage unit to the server computer: and the server computer comprises an analysis unit which reappears a communication information by analyzing the communication packets using the electrical file received from the communication terminal.

In the above mentioned first and second aspects of the present invention, it is preferable that the analysis unit generates an information table according to a header information of the communication packet.

In the above mentioned first and second aspects of the present invention, it is preferable that the analysis unit generates a reappeared data visually or auditory according to a main data in the communication packet.

In the above mentioned first and second aspects of the present invention, it is preferable that the server computer is connected to plural local area networks, each of which is connected to plural communication terminals.

In the above mentioned first and second aspects of the present invention, it is preferable that the storage unit has a function to encrypt the electrical data of the communication packet and store it.

The effects of the present invention are described hereinafter.

The first aspect of the present invention differs from the art of storing the communication packets using the relay device in that the storing processing of the communication packet does not provide any load to the data communication network, because the first aspect of the present invention makes the electrical file of the electrical data of a communication packet to be sent and an electrical data of a received communication packet in the communication terminal, and stores it into the communication terminal itself. Additionally, according to the first aspect of the present invention, there is no possibility that the communication packet loss will occur, because the communication packet of before sending and after being received are stored into the communication terminal. Therefore, the first aspect of the present invention can obtain the reliability of the communication packet storing processing without reducing the communication rate of the data communication network.

Moreover, according to the first aspect of the present invention, it is unnecessary to discard a part of the communication packets for saving other communication packet. Therefore, according to the first aspect of the present invention, the communication packet can be stored without reducing the communication reliability of the data communication network.

In addition, according to the first aspect of the present invention, the server computer analyzes the communication packets using the electrical files received from the communication terminal. As a result, it becomes easier to execute an advanced analysis processing and intelligibly displaying processing of the analysis processing result in the short period of time than the case which the analyzing of the communication packets stored in the relay device are always executed by each communication terminal. Then, by using the analysis processing result, it can be exactly confirmed whether an illegal access or an electrical mail communication is actually executed. Moreover, the electrical files can be used as a reliable evidence based on the result of the confirmation. In other words, the first aspect of the present invention can inexpensively provide a reliable evidence concerning a specified communication using a specified communication terminal without advanced processing of the communication terminal.

According to the second aspect of the present invention, the same technical effect as the first aspect of the invention can be obtained. In addition, the second aspect of the present invention makes electrical files of electrical data of communication packets to be sent and electrical data of received communication packets by each predetermined acquisition unit, and stores the electrical files into the communication terminal itself. In other words, in the second aspect of the present invention, the electrical files are made not by each communication, but by each predetermined acquisition unit, for example, unit of time, unit of data amount and so on. Consequently, it is very difficult for average user to distinguish the communication packets of the user's desired communication from the electrical files. Therefore, the second aspect of the present invention can prevent the user distinguishing the electrical data concerning his (her) desired communication and breaking or modifying the distinguished electric data in spite of storing the electric data of the communication packets into his (her) communication terminal.

According to the first and second aspect of the present invention, the user can easily understand the result of the header information analysis, when an information table for showing the header information of the communication packets is generated.

According to the first and second aspect of the present invention, the user can easily understand the result of the communication content analysis when a data for showing the reappearance of the main data of the communication packet is generated.

According to the first and second aspect of the present invention, the analyzing of the communication packets can be executed inexpensively as a whole, when the analyzing processing in connection with plural LANs using single server computer is executed.

According to the first and second aspect of the present invention, the communication secrecy can be protected, when the electrical data of the communication packets are encrypted.

BRIEF DESCRIPTION OF THE DRAWINGS

The followings and other objects, features and advantages of the present invention will be better understood from the following description in connection with the accompanying drawings, in which:

FIG. 6 is a diagram showing an example of information table generated by the server computer according to the embodiment.

DESCRIPTION OF THE PREFERRED EMBODIMENTS

The communication information analysis system according to a preferred embodiment of the present invention are described with referencing to the drawings in the following. It should be understood that the drawings show components in size, in shape, and in relation of arrangement only so roughly as to understand the present invention, and the numerical conditions described below are only examples.

The present embodiment is described based on a case where a communication information analysis service using a communication information analysis system of the present invention is provided.

Figure 1:
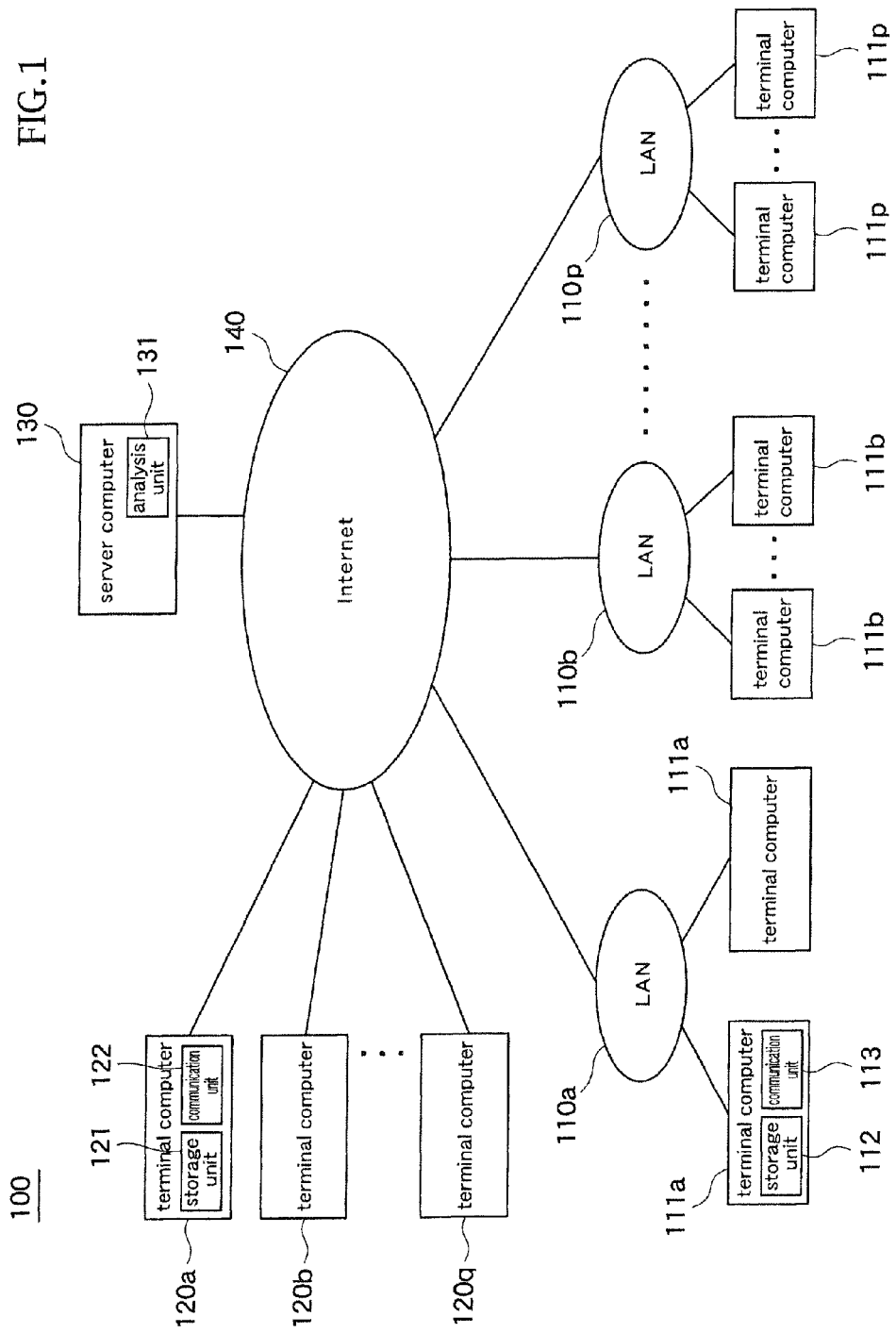
FIG. 1 is a conceptual diagram showing the whole construction of the communication information analysis system according to a preferred embodiment of the present invention.

FIG. 1 is a conceptual diagram showing the whole construction of the communication information analysis system 100 of the present embodiment.

As shown in FIG. 1, the communication information analysis system 100 of the present embodiment comprises plural LANs 110a, 110b, ..., 110p, plural terminal computers 120a, 120b, ..., 120q and a server computer 130. These devices are inter-communicatively connected to each other via the Internet 140.

The LANs 110a to 110p are constructed as the networks within companies, for example. One LAN is owned by one company, for example. Each of the LANs 110a to 110p is communicatively connected to plural terminal computers 111a, 111b, ..., 111p. The companies having the LANs 110a to 110p are each provided with the communication information analysis service of the present embodiment.

The terminal computers 111a correspond to the communication terminal of the present invention. Each of the terminal computers 111a is communicatively connected to other computer terminals 111a within the LAN 110a, moreover, communicatively connected to the external communication devices such as terminal computers 111b to 111p, 120a to 120q. Each of terminal computers 111a comprises a storage unit 112 which stores the electrical data of the communication packets to be sent and the received communication packets as electrical files (hereinafter, called 'pkt files'), and a communication unit 113 which sends the stored pkt files to the server computer 130. The storage unit 112 and the communication unit 113 can be realized using the exclusive application software, for example. Other terminal computers 111b to 111p located within the LAN 110b to 110p are similar to the communication to the terminal computers 111a.

The terminal computer 120a corresponds to the communication terminal of the present invention. The terminal computers 120a is communicatively connected to the external communication devices such as terminal computers 111b to 111p and 120b to 120q. Similar to the above described terminal computers 111a to 111p, the terminal computers 120a comprises a storage unit 121 which stores the electrical data of the communication packets to be sent and the received communication packets as pkt files, and a communication unit 122 which sends the stored pkt files to the server computer 130. Similar to the above described terminal computers 111a to 111p, the storage unit 121 and the communication unit 122 can be realized using the exclusive application software, for example. Other terminals 120b to 120q are similar to the terminal computers 120a. The individual user etc. of the terminal computer 120a to 120q are provided with the communication information analysis service of the present embodiment.

The server computer 130 is a computer system constituted by one or more computers. The server computer 130 receives the pkt files from the terminal computers 111a to 111p and 120a to 120g. The server computer 130 comprises an analysis unit 131. The analysis unit 131 analyzes the communication packets, which are sent and received by the terminal computers 111a to 111p and 120a to 120q, using the pkt files. It is preferable that the analysis unit 131 is constituted using the large-scale computer with high processing capacity. As described hereinafter, the analyzing processing generate the information tables showing the header information of the communication packets and the reappeared data according to the main data in the communication packets. In the present embodiment, the server computer 130 is managed and administered by the provider of the communication information analysis service.

The behaviors of the communication information analysis system 100 are described with referencing to FIGS. 2 to 7 in the following.

As described above, the communication information analysis service of the present embodiment is provided using the communication information analysis system 100. The service of the present embodiment can be used by the units of company, that is corresponding to the LAN 110a to 110p of FIG. 1, or an individual, that is corresponding to the terminal computers 120a to 120q. The present embodiment is described based on the case in which the terminal computer 120a uses the service, but the cases in which the other computer terminals use the service are similar to the case of the terminal computer 120a.

Figure 2:
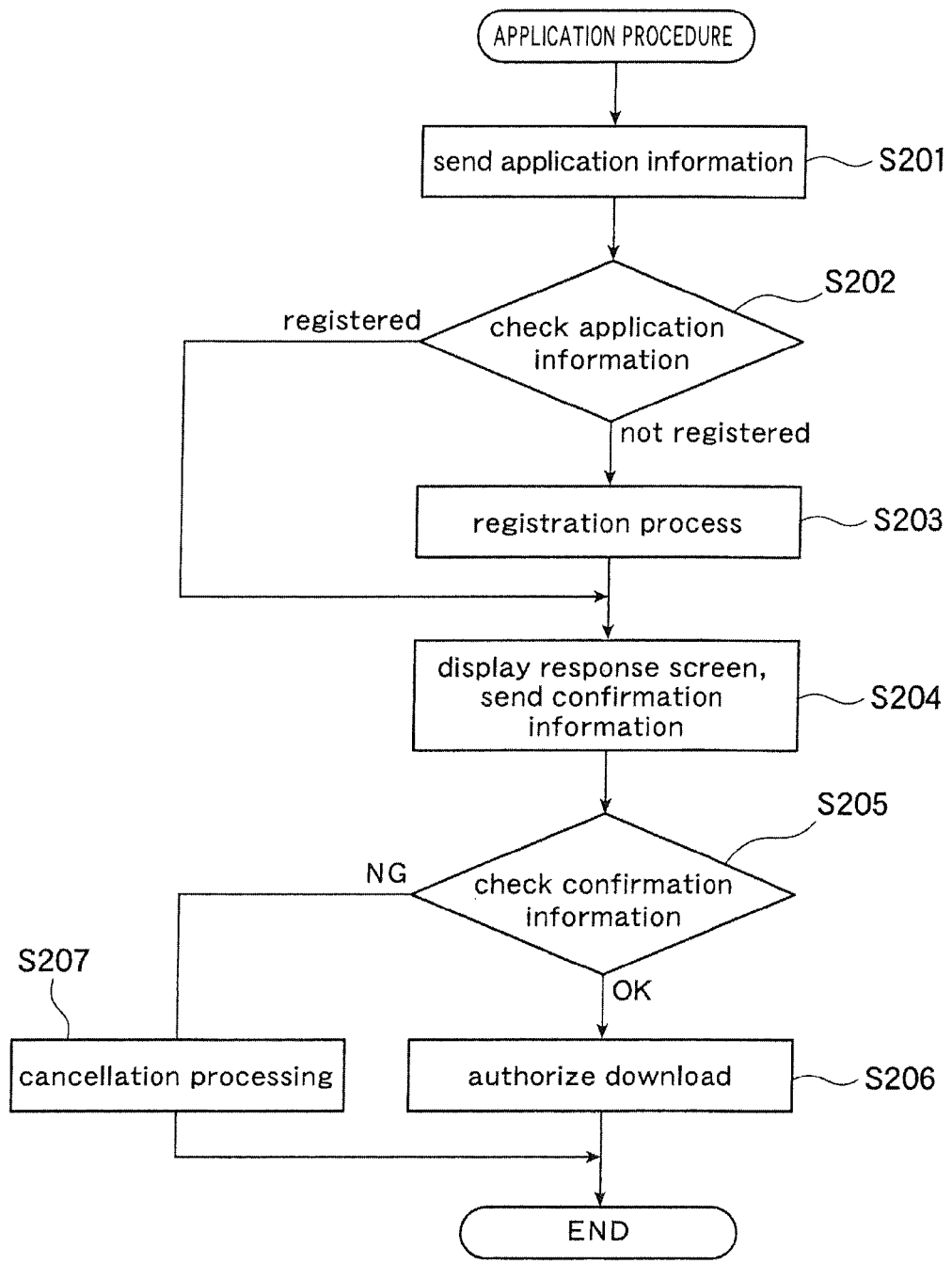
FIG. 2 is a general flowchart showing the application procedure of the communication packet analysis service according to the embodiment.

FIG. 2 is a general flowchart showing the application procedure of the communication information analysis service according to the present embodiment. The application procedure can be executed using the Internet 140, for example.

When the terminal computer 120a make access to the server computer 130, the server computer 130 makes the terminal computer 120a to display a Web application form. The applicant inputs application information to the application form and sends the application information to the server computer 130 (see step S201). The application information contains, for example, the individual name or the corporate name of the applicant, the contact information, the electrical mail address, the manner of payment, the applicant's desired password and so on.

After receiving the application information, the server computer 130 checks the application information (see step S202). The check processing checks, for example, whether the applicant's registration for using the service have already been completed. In the case the registration is not completed, the server computer 130 registers the application information (see step S203). In contrast, the registration have already been completed, the processing of the step S204 or later are executed without executing the step S203.

Then, the server computer 130 makes the terminal computer 120a to display a response screen for responding to the application information, which is not shown in Figures (see step S204). In the case the application information is processed correctly, the response screen displays an information for confirming the manner of payment of service charge. In addition, the response screen executes a displaying for checking the resource. The resource means the processing capacity related to the hardware of the server computer 130 such as the capacity of the memory and the operating rate of the CPU and so on. For example, in the case the applicant's data communication volume is very large, there is a risk that the resource of the server computer 130 may lack. Therefore, the applicant's data communication volume and other necessary matters are confirmed using the response screen. The applicant executes confirming, inputting and so on, then, clicks the 'confirmation button'. Consequently, the information indicating the result of confirmation is sent from the terminal computer 120a to the server computer 130.

The server computer 130 receives the result information of the confirmation from the terminal computer 120a, and checks the received information (step S205). The checking process confirms whether the server computer 130 can ensure the necessary resource. If the application is decided to be accepted based on the check, the server computer 130 executes the processing to authorize the download of the software for storing the communication packets (see step S206). In contrast, if the resource is decided not to be ensured at the step S205, the application of the communication information analysis service is cancelled (see step S207).

Incidentally, it is possible that the server computer 130 is constituted to store the information related to the application at predetermined time period when the resource is decided not to be ensured. Furthermore, the server computer 130 is constituted to inform the applicant that the resource is now ensured and so the application will be allowed, if the resource are ensured within the time period of storing the application.

Figure 3:
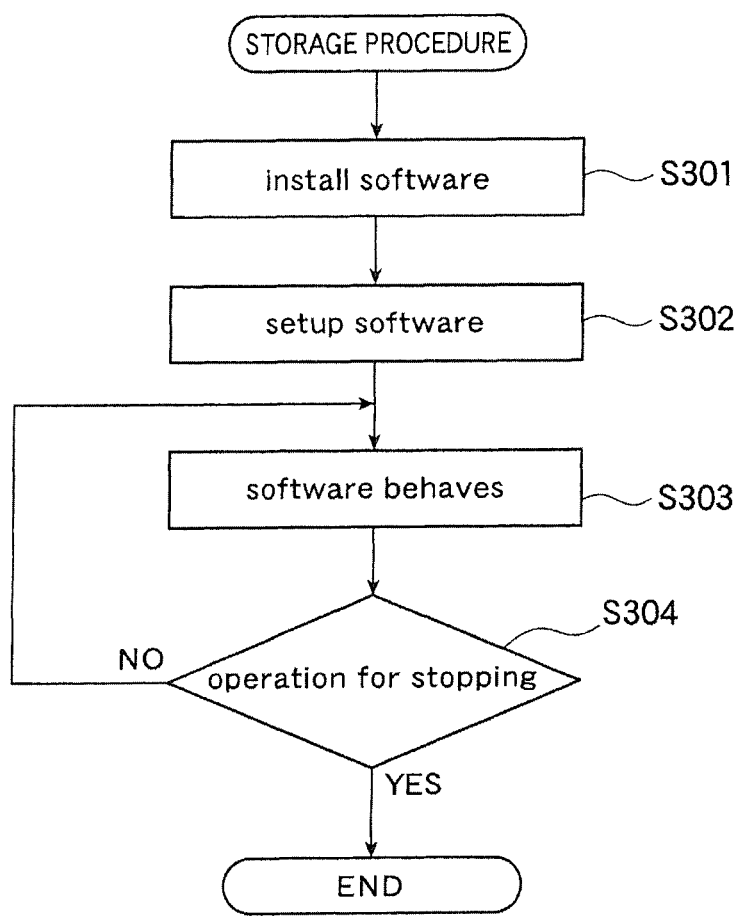
FIG. 3 is a general flowchart showing the procedure for storing the communication packets according to the embodiment.
Figure 4:
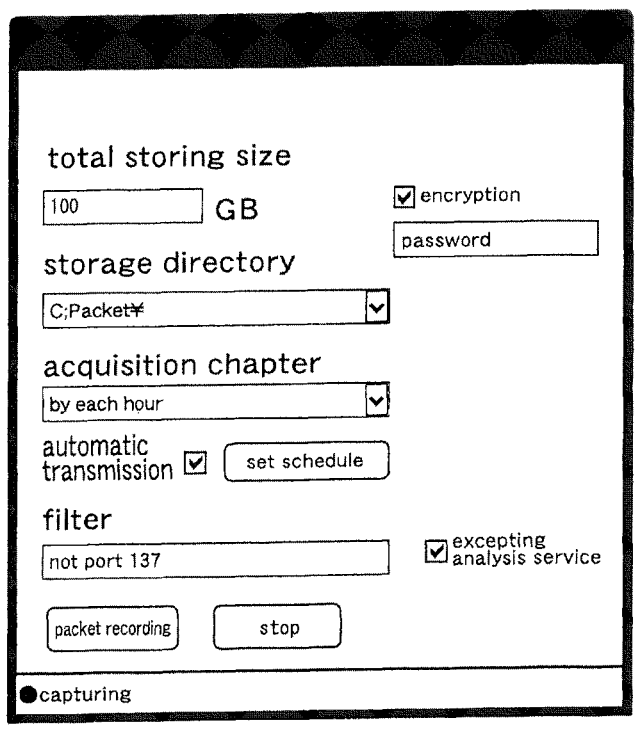
FIG. 4 is a conceptual diagram showing the screen for setting up the software for storing the communication packets according to the embodiment.

Next, the procedure of storing and analyzing the communication packets using the service of the present embodiment is described with referencing to FIGS. 3 and 4.

As described above, the terminal computer 120a of the present embodiment uses the application software for storing the communication packets. Some generalized application software of the communication packet analysis such as Wireshark is appropriable as such application software, however, the present embodiment is described in regard to the case which the exclusive software for the present service is used.

FIG. 3 is a general flowchart showing the procedure for storing the communication packets in the present embodiment.

The user firstly obtains the software for storing the communication packets by downloading it from the server computer 130 or other method, and installs the software to the terminal computer 120a (see step S301). Consequently, the storage unit 121 and the communication unit 122 described above (see FIG. 1) are constructed in the terminal computer 120a.

It is preferable that the software comprises the function to store the pkt file after encrypting it and the function to store the pkt file after compressing it.

The encryption function can prevent the communication packet data stored in the pkt files to be browsed or modified by the unauthorized person. When the encryption function is provided, it is preferable that the encrypted pkt files can be decrypted only by the exclusive software for the present service and the server computer 130. Consequently, when some person copies the pkt files from the terminal computer 120a to a mobile type memory etc. and brings out the memory, the person cannot understand the content of the pkt files, and so the person cannot modify the pkt files.

Additionally, if the pkt file is under the encrypted condition when sent to the server computer 130, the unauthorized person cannot understand the content of the pkt files even if the unauthorized person has obtained the pkt files illegally on the Internet 140.

Moreover, it is possible that the result of the analysis is sent after being encrypted, when the server computer 130 analyzes the pkt file and sends the result of the analysis to the terminal computer 120a. It is preferable that the encrypted analyzing result can be decrypted only by the exclusive software for the present service. Consequently, the unauthorized person cannot understand the content of the analyzing result even if the unauthorized person has obtained the analyzing result illegally on the Internet 140. Furthermore, the unauthorized person cannot understand neither modify the content of the analyzing result even if the unauthorized person copies the analyzing result from the terminal computer 120a to a mobile type memory device and brings out the memory device.

The compression function can reduce the storage area necessary for storing the pkt files, moreover, can reduce the load of the data communication network when sending the pkt files to the server computer 130.

Then, the user sets up the software for storing the communication packets (see step S302). FIG. 4 is a conceptual diagram showing the screen for setting up the software for storing the communication packet.

In the setting up screen, 'total storing size' field is an input field for setting the total data size of the communication packet stored as the pkt files. In the example of FIG. 4, the total storing size is set to 100 gigabyte. The storage unit 121 executes the processing for controlling the total size of the stored communication packets to equal to or smaller than the set size.

Concretely, the way of canceling or overwriting the older files, or the way of warning and urging the backup of the older files can be employed, for example, however, the present embodiment does not restrict the way for controlling the total size of the stored communication packets.

The checkbox 'encryption' is used for selecting whether encrypting the pkt files before storing. When selecting the encryption of the pkt files, the user specifies the password for code breaking using the input field of the 'password'.

The 'storage directory' field is the setting up field for specifying the storage area for the pkt files. In the example of FIG. 4, the pkt files are stored into the folder named 'packet' located in the operating system storing area C in the terminal computer 120a.

The 'acquisition chapter' field is the setting up field for specifying the cycle to generate new pkt files. For example, when the 'acquisition chapter' is set up 'by each hour', the communication packets generated within the corresponding one hour are stored into the same pkt file. The 'acquisition chapter' can be set up based on the unit of the data amount or other kind of units in addition to the unit of the time period. Incidentally, when both of 'total storing size' and 'acquisition chapter' are set up, the processing when only one of theses setting is satisfied presents a problem. For example, both of setting condition cannot be satisfied when the 'total storing size' is set up to '100 gigabyte', the 'acquisition chapter' is set up to 'by each hour' and the total storing size within one hour is larger than 100 gigabyte. Such problem can be solved by ignoring the setting of the 'total storing size' and storing the communication packets larger than 100 gigabyte, for example, however, the present embodiment does not restrict the way for solving such problem.

The 'automatic transmission' field is the setting up field for sending the stored pkt files to the server computer 130 automatically. This setting up field contains the checkbox for setting up whether the automatic transmission is executed, and the setting up button for specifying the schedule of the automatic transmission. When the schedule setting up button is clicked, the screen for setting up the concrete schedule is displayed (not shown in figures). By using this screen, the setting of the schedule by the day of the week (for example, the setting for sending the pkt files every Monday), the setting of the schedule by the hour (for example, the setting for sending the pkt files every one hour), the setting corresponding to the processing when the terminal computer 120a is not powered on at the set transmission time (for example, setting to send the pkt files just after the power activation or to send the pkt files at the next automatic transmission time) and so on can be done. Furthermore, the way to register plural kinds of these settings as the automatic transmission schedule can be employed. In addition, the way to limit the communication data amount of automatic transmission based on the communication rate can be employed. Moreover, the way that the exclusive software for the present service automatically executes the setting of the automatic transmission based on the user's communication environment can be employed. Incidentally, the present embodiment does not restrict the way for setting up the automatic transmission, in other words, the way for setting up the automatic transmission can be decided arbitrarily when the exclusive software for the present service is designed.

The 'filter' field is the input field for setting up the communication packet types of not stored. According to the present embodiment, the communication packet types of not stored are set up using the port numbers of the data communication. However, the communication packet types of not stored can be set up using other kind of basis, for example, the application software used for the communication.

The 'excepting analysis service' field is the checkbox for setting up whether the communication packets sent and received between the terminal computer 120a and the server computer 130 are stored into the pkt files. The checkmark is inserted into the checkbox when the communication packet for the communication information analysis service does not need to be stored.

After the set up using the above described fields, the user clicks the 'packet recording' button. Then, the behavior of the software for the communication packet storing starts (see step S303 of FIG. 3). As described above, this communication packet storing software behaves as the storage unit 121 and the communication unit 122 (see FIG. 1).

The storage unit 121 monitors the terminal computer 120a, e.g. the data link layer (that is, the second layer of the OSI reference model) of the terminal computer 120a, and acquires the sent and received communication packets. Furthermore, the storage unit 121 saves all of the communication packets to the pkt files, except for the communication packets corresponding to the exclusion settings. The exclusion settings means the setting of port number specified by the filter input field of FIG. 4, the excepting setting of the analysis service and so on.

The storage unit 121 stops the monitoring and saving operation when the user clicks the 'stop' button shown in FIG. 4, when the terminal computer 120a is shut down and so on (see step S304).

Figure 5:
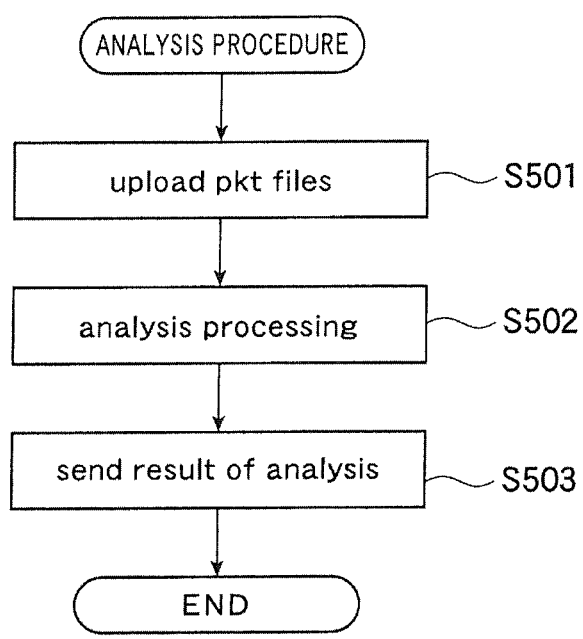
FIG. 5 is a general flowchart showing the procedure for analyzing the communication packets according to the embodiment.

FIG. 5 is the general flowchart showing the procedure for analyzing the communication packet using the pkt files stored in the terminal computer 120a.

When the analysis of the communication packets become necessary, the user makes the terminal computer 120a to upload the corresponding pkt files to the server computer 130 by operating the communication unit 122 constructed by the software for the communication packets storing, as necessary (see step S501 of FIG. 5).

The analysis unit 131 of the server computer 130 analyzes the pkt files (see step S502). Then, the analysis unit 131 generates the table information according to the header information of the communication packets etc. and the reappearing data corresponding to the main data of the communication, both of which are generated by each communication of the terminal computer 120a, as a result of the analysis.

Then, the server computer 130 sends the result of the analysis to the terminal computer 120a (see step S503). The communication unit 122 in the terminal computer 120a receives the result of the analysis and stores it into the predetermined internal storage area. Incidentally, when the communication packet analysis corresponding to the terminal computers 111a to 111p connected to the LAN 110a to 110p are executed, it is possible to send the result of the analysis to the terminal computer of the LAN administrator. Moreover, it is possible to authorize the browsing of the result of the analysis only to the specified plural people, for example, the LAN administrator and the user of the corresponding terminal computer. In addition, when only the plural people are authorized to browse the analyzing result in connection with one terminal computer, it is possible that only a part of authorized people can browse all of the analyzing result whereas other people can browse only the specified part of the analyzing result (for example, other people can browse only the analyzing result of electrical mails and Web sites). Furthermore, it is possible to have the server computer 130 not send the analyzing result to the user side, if unnecessary.

FIG. 6 shows an example of information table generated by the server computer 130.

As shown in FIG. 6, by using the information table generated in the present embodiment, the user can easily understand the transmission source information (that is, IP address, port number and MAC address), the transmission destination information (that is, IP address, port number and MAC address), the communication time, the communication data amount, throughput and so on. Therefore, the communication record can be confirmed easily when the illegal access occurs.

Figure 7A:
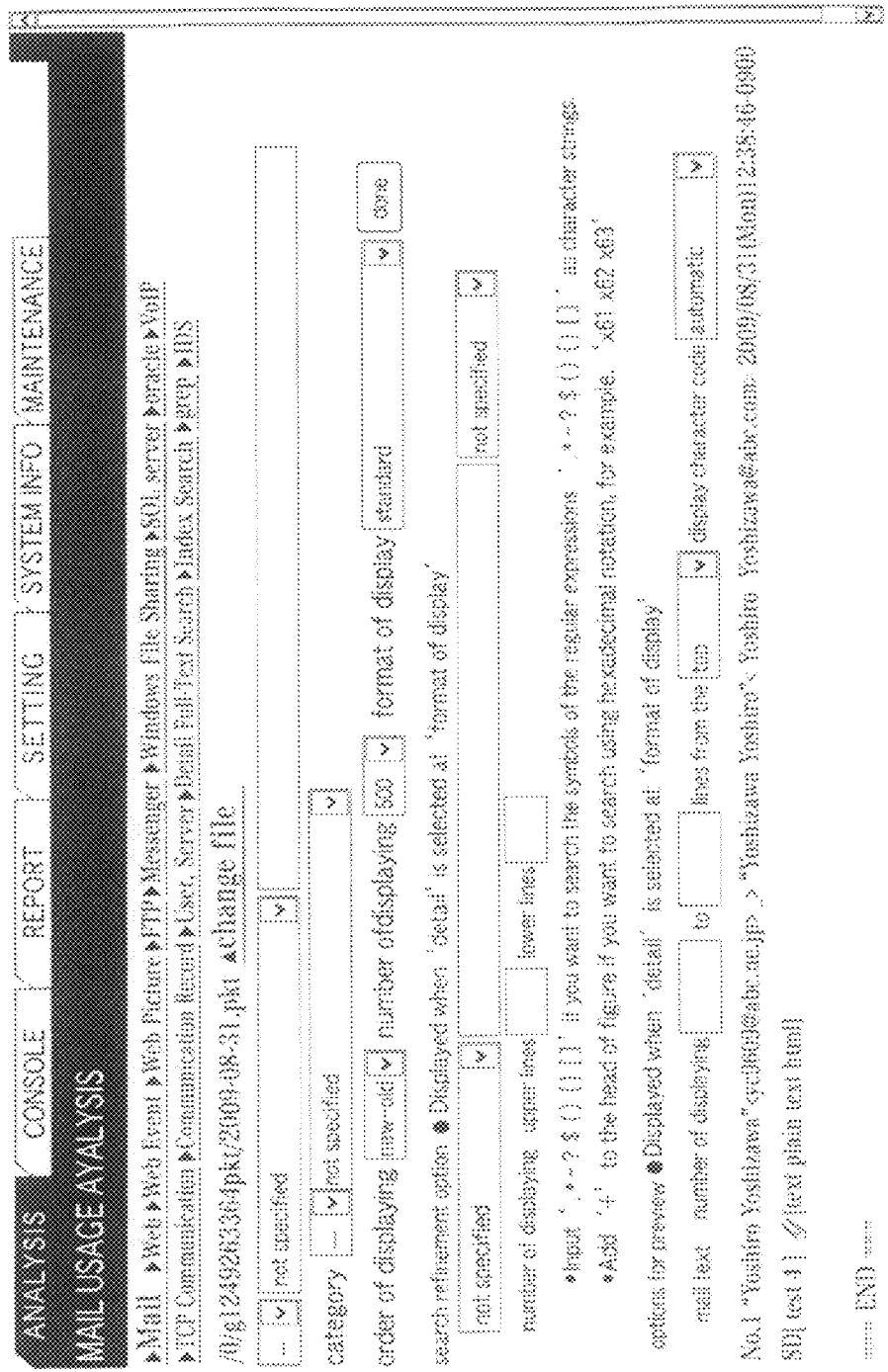
FIGS. 7A and 7B are conceptual diagrams showing an example of communication information reappeared by the server computer according to the embodiment.
Figure 7B:

FIGS. 7A and 7B are conceptual diagrams showing an example of communication information reappeared by the server computer 130, and concretely showing the case where the main data of the communication packets sent and received using the electrical mail are reappeared. In this example, the 'text/plain' or 'text/html' in the image shown in FIG. 7A is clicked, and then, the visual reappeared data of the text body in the electrical mail is displayed as shown in FIG. 7B. As described using the example of FIGS. 7A and 7B, by using the reappeared information generated by the present embodiment, it is easy to visually understand the contents of the communicated mails, browsed Web sites, motion pictures, messengers and so on. Additionally, it is possible to auditory reappear the IP telephone or other voice information. The reappeared data can be displayed or listened using the web browser installed in the terminal computer 120a, for example.

It is very difficult for the average level users to decode the contents of the communication packets stored in the pkt files, differing from the decoding of the data stored in the software for the electrical mail or the Web browser. Therefore, it is substantially impossible to distinguish only the communication packets corresponding to the specified communication from the pkt files and break or modify the distinguished communication packets. Consequently, according to the present embodiment, it is substantially impossible to hide the occurrence of the illegal access or to hide the specific communication using the electrical mail, if the terminal computer of the present embodiment is used. So, it may be said that the pkt files of the present embodiment has higher reliability as the evidence against whether the communication is executed actually. The password for code breaking is input to the terminal computer by the user in the present embodiment, but the reliability still increases if only the administrator of the LAN 110a to 110p is notified of the password for code breaking.

As described above, the communication information analysis system 100 according to the present embodiment stores the communication packets sent and received by the terminal computers 111a to 111p and 120a to 120q into the terminal computers 111a to 111p and 120a to 120q themselves as the electrical files (that is, pkt files), so the storing processing will have extremely small influence on the communication rate of the data communication network, comparing with the case of a relay device storing all communication packets. Therefore, the present embodiment can store the communication packet to be analyzed without reducing the communication rate of the data communication network.

According to the communication information analysis system 100 of the present embodiment, the loss of the communication packets will not occur in the data communication network and the intentional discarding of the communication packets is unnecessary. Therefore, according to the present embodiment, the reliability of the storing does not decrease even if the high-speed data communication network is used.

According to the present embodiment, the server computer 130 analyzes the communication packets using the pkt files received from the terminal computers 111a to 111p and 120a to 120q. Therefore, the advanced analyzing processing can be executed in a short time comparing with the case the analyzing processing are executed by each of the terminal computers 111a to 111p and 120a to 120q itself, if the computer having enough high processing ability is used as the server computer 130.

According to the present embodiment, the communication security can be kept, because the pkt files can be stored into the terminal computers 111a to 111p and 120a to 120q and sent to the server computer 130 after encrypted.

According to the present embodiment, the personal users (for example, the users of the terminal computers 120a to 120q) and the small organization's user (for example, the managers of the local Area Networks 110a to 110p) can execute the analysis of the communication packets inexpensively because the users do not need to have the computer having high processing ability by themselves.

What is claimed is:

1. A communication information analysis system comprising:
   a first terminal computer communicationally connected to a second terminal computer by way of a data communication network; and
   a server computer communicationally connected to the first terminal computer by way of the data communication network to analyze communication between the first and the second terminal computer, wherein:
   the first terminal computer comprises:
      computer hardware executing one or more processes to:
         register for installation of a communication packet storing software for storing communication packets tranceived between the first terminal computer and the second terminal computer;
         execute the installed communication packet storing software for accepting settings of specifying a size of stored communication packets in an electronic file and a setting of specifying a time period cycle to generate the electronic file, and responsive to a packet recording command monitoring communication packets of the first terminal computer to acquire and store, in an electronic file, data of a first communication packet when a user of the first terminal computer operates an application software of the first terminal computer to send the first communication packet to the second terminal computer, and acquire and store data of a second communication packet received by the first terminal computer from the second terminal computer, the data of the second communication packet to be reappeared visually or auditory by the application software of the first terminal computer, the first and second communication packets tranceived between the first and second terminal computers are acquired and stored in the electronic file according to at least one of the setting of the size of stored communication packets in the electronic file or the setting of the time period cycle to generate the electronic file, thereby the electronic file for the first terminal computer storing data of both the first and second communication packets transceived between the first and second terminal computers; and
         sending the electronic file to the server computer; and
   the server computer comprises:
      computer hardware executing one or more processes to:
         store the electronic file received from the first terminal computer into the server computer, and
         analyze the data of the first and second communication packets stored in the electronic file received from the first terminal computer, to reappear communication information visually or auditory according to the data of the first and second communication packets transceived between the first and second terminal computers.

2. The communication information analysis system according to claim 1, wherein the reappeared communication information by the server computer contains information generated according to both header information of the first and second communication packets stored in the electronic file received from the first terminal computer.

3. The communication information analysis system according to claim 1, wherein the reappeared communication information by the server computer is data according to a main communication data in the first and second communication packets stored in the electronic file received from the first terminal computer.

4. The communication information analysis system according to claim 1, wherein a plurality of first terminal computers are communicationally connected to respective plurality of local area networks, a local area network of the plurality of local area networks capable of being communicationally connected to the server computer by way of the data communication network.

5. The communication information analysis system according to claim 1, wherein the computer hardware of the first terminal computer executes a process to encrypt the data of the first and second of the communication packets stored by the first terminal computer in the electronic file.

6. A first terminal computer communicationally connected to a second terminal computer and a server computer by way of a data communication network, the first terminal computer comprising:
   computer hardware configured with programs executing one or more processes to:
      register for installation of a communication packet storing software for storing communication packets transceived between the first terminal computer and the second terminal computer; and execute the installed communication packet storing software for accepting settings of specifying a size of stored communication packets in an electronic file and a setting of specifying a time period cycle to generate the electronic file, and responsive to a packet recording command monitoring communication packets of the first terminal computer to create the electronic file containing data of a first communication packet to be sent from the first terminal computer to the second terminal computer, the data of the first communication packet acquired when a user of the first terminal computer operates an application software of the first terminal computer to send the first communication packet to the second terminal computer, and containing data of a second communication packet received by the first terminal computer from the second terminal computer, the data of the second communication packet to be reappeared visually or auditory by the application software of the first terminal computer, the first and second communication packets tranceived between the first and second terminal computers are acquired and stored in the electronic file according to at least one of the setting of the size of stored communication packets in the electronic file or the setting of the time period cycle to generate the electronic file, thereby the electronic file for the first terminal computer storing data of both the first and second communication packets transceived between the first and second terminal computers, wherein response to an instruction from the first terminal computer, the stored electronic file is uploaded to the server computer which analyzes the data of the first and second communication packets stored in the electronic file received from the first terminal computer to reappear communication information visually or auditory according to the data of the first and second communication packets transceived between the first and second terminal computers.

7. The first terminal computer according to claim 6, wherein the reappeared communication information by the server computer contains information generated according to both header information of the first and second communication packets stored in the electronic file sent from the first terminal computer.

8. The first terminal computer according to claim 6, wherein the reappeared communication information by the server computer is data according to a main communication data in the first and second communication packets stored in the electronic file sent from the first terminal computer.

9. The first terminal computer according to claim 6, wherein the first terminal computer is communicationally connected to a local area network capable of being connected to the server computer by way of the data communication network.

10. The first terminal computer according to claim 6, wherein the computer hardware is configured with a program to encrypt the data of the first and second communication packets stored in the electronic file sent by the first terminal computer to the server computer.

\* \* \* \* \*

UNITED STATES PATENT AND TRADEMARK OFFICE
CERTIFICATE OF CORRECTION

| | | |
|---|---|---|
| PATENT NO. | : 9,154,513 B2 | Page 1 of 1 |
| APPLICATION NO. | : 13/011078 | |
| DATED | : October 6, 2015 | |
| INVENTOR(S) | : Takayoshi Nakayama | |

It is certified that error appears in the above-identified patent and that said Letters Patent is hereby corrected as shown below:

In the Claims

Claim 1, Column 12, Line 10

Delete "tranceived" and insert --transceived--, therefor.

Claim 6, Column 13, Line 21

Delete "tranceived" and insert --transceived--, therefor.

Signed and Sealed this
Ninth Day of February, 2016

Michelle K. Lee
*Director of the United States Patent and Trademark Office*